US009183964B2

(12) United States Patent
Pike-Biegunski et al.

(10) Patent No.: US 9,183,964 B2
(45) Date of Patent: Nov. 10, 2015

(54) CRYSTALLINE METALLIC NANO-PARTICLES AND COLLOIDS THEREOF

(71) Applicant: Nano Technologies Group, Inc., Naperville, IL (US)

(72) Inventors: Maciej Jan Pike-Biegunski, Serock (PL); Pawel Biegunski, Naperville, IL (US)

(73) Assignee: NANO TECHNOLOGY GROUP, INC., Naperville, IL (US)

( * ) Notice: Subject to any disclaimer, the term of this patent is extended or adjusted under 35 U.S.C. 154(b) by 384 days.

(21) Appl. No.: 13/864,419

(22) Filed: Apr. 17, 2013

(65) Prior Publication Data

US 2013/0230719 A1     Sep. 5, 2013

Related U.S. Application Data

(63) Continuation of application No. 12/442,050, filed as application No. PCT/PL2007/000067 on Sep. 20, 2007, now abandoned.

(30) Foreign Application Priority Data

Sep. 21, 2006 (PL) .......................... 380649

(51) Int. Cl.
| | | |
|---|---|---|
| H01B 1/00 | (2006.01) | |
| H01B 1/22 | (2006.01) | |
| H01B 1/02 | (2006.01) | |
| B01J 13/00 | (2006.01) | |
| B22F 1/00 | (2006.01) | |
| B22F 9/14 | (2006.01) | |
| B82Y 30/00 | (2011.01) | |

(52) U.S. Cl.
CPC .............. *H01B 1/02* (2013.01); *B01J 13/0043* (2013.01); *B22F 1/0022* (2013.01); *B22F 9/14* (2013.01); *B82Y 30/00* (2013.01); *Y10T 428/2982* (2015.01)

(58) Field of Classification Search
USPC ........ 252/51, 500, 512; 977/773, 932; 428/12
See application file for complete search history.

(56) References Cited

U.S. PATENT DOCUMENTS 3,556,976 A   1/1971   Ishibashi
5,437,243 A   8/1995   Pike-Biegunski

FOREIGN PATENT DOCUMENTS

| DE | 1006838 B | 4/1957 |
|---|---|---|
| PL | 328182 A1 | 2/2000 |
| PL | 365435 A1 | 8/2005 |
| PL | 371355 A1 | 5/2006 |
| WO | 2005080030 A2 | 9/2005 |

OTHER PUBLICATIONS

European Patent Office, International Search Report of International Application No. PCT/PL2007/000067 dated Mar. 19, 2008.
Blanco, C. et al., "An improved electronic transformer for low power halogen cycle lamps," IEEE Transactions on Industry Applications, Jan. 1, 1997, vol. 33, No. 1, p. 1979-1983, USA.
Pike-Biegunski, M.J., "Damages to Electrical Connections by Electotensiometric Forces" 29th Annual Connector and Interconnection Symposium and Trade Show, Boston MA, Sep. 16-18, 1996, pp. 371 to 395. Proceedings.
Pike-Biegunski, M.J., "Electromagnetic radiation from Termination Points of Metallic Conductor", Forty First Holm Conference on Electrical Contacts, Oct. 2-4 Montreal, Canada 1995, pp. 165 to 175. Proceedings.
Pike-Biegunski, M.J., "Electrical Conductance at Tin-Tin Interfaces under Stationary and in Motion Conditions" 36th IEEE Holm Conference on Electrical Contacts Montreal, Canada, Aug. 1990, pp. 232 to 247. Proceedings.
Pike-Biegunski, M.J., "The Nonthermal Interactions Between Electrons and the Crystalline Lattice" Zeszyty Naukowe Politechniki Lodzkiej,—Elektryka z.95 2001, pp. 17 to 40. (jezykangielski).
Pike-Biegunski, M.J., "Rozpad Wybuchowy Drutu, "Przeglad Elektrotechniczny 1'99 (styczen1999) strony 11 do 15. (jezyk polski) in translation: "On the Explosive Wire Degradation" The Electro Technical Review magazine, Poland.
Pike-Biegunski, M.J., "Zastosowanie Materia10w Nano Czasteczkowych w Medycynie i Farmacji "miesiecznik: Lek w Polsce: 3 kolejne artykuly nr.9,10,11 wydania z roku 2005 in translation: "On the Nano Materials Applications to Medicine and Pharmacy" Drugs in Poland magazine.
Sacks et al., "Radiative and Electrical Properties of Exploding Silver Wires," Applied Spectroscopy, 1974, p. 518-535, vol. 28, No. 6.
The Random House Dictionary Revised Edition, J. Stein, Editor, (C) 1980, New York, p. 839, col. 2.
Molokov et al., Journal of Applied Physics, vol. 30, 1997, p. 3131-3141.
Sir John William Dawson, Modern Science in Bible Lands, Hodder and Stoughton, London, UK, 1888, p. 597.

*Primary Examiner* — Monique Peets
(74) *Attorney, Agent, or Firm* — Perkins IP Law Group LLC; Jefferson Perkins

(57) ABSTRACT

Crystalline metallic nano-particles (nano-crystallites) are formed by a non-explosive application of electrical energy to a conductive wire. The nano-particles take the form of platelets having a diameter of 2-8 nm and a thickness in the range of 3-5 atomic layers.

2 Claims, 14 Drawing Sheets

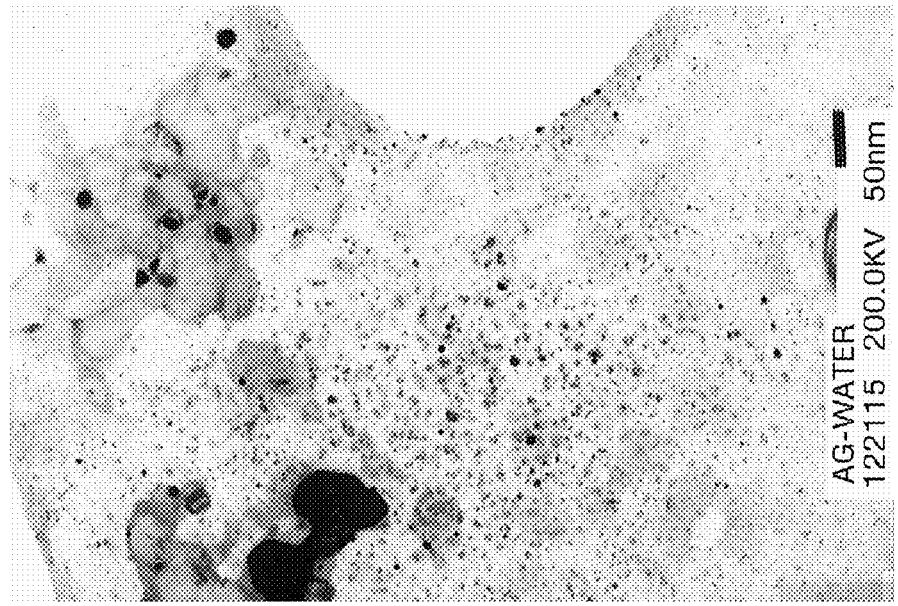
FIG. 11
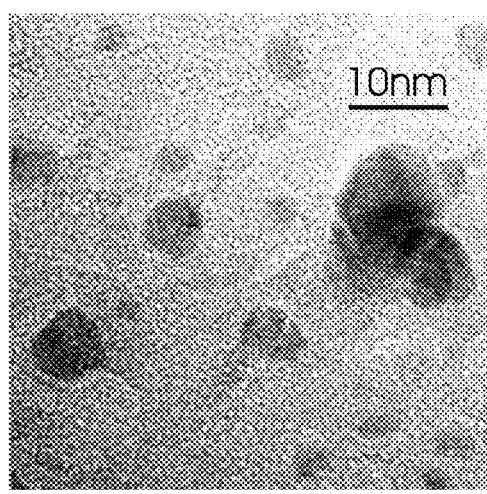    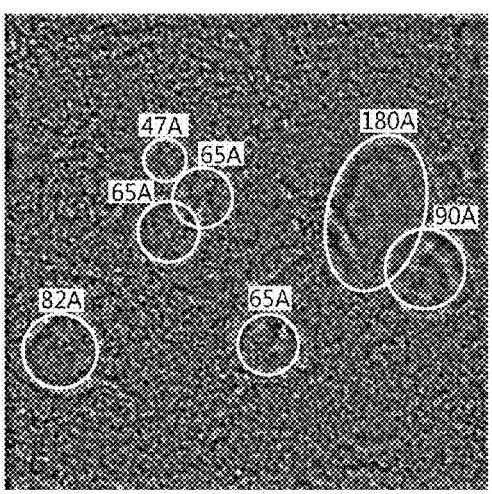
FIG. 12A                FIG. 12B

CRYSTALLINE METALLIC NANO-PARTICLES AND COLLOIDS THEREOF

RELATED APPLICATIONS

The present application is a continuation of copending U.S. patent application Ser. No. 12/442,050, filed on Mar. 19, 2009 as a United States National Stage of International Patent Application No. PCT/PL2007/000067 filed Sep. 20, 2007. The specification and drawings of this prior international patent application are fully incorporated by reference herein.

BACKGROUND OF THE INVENTION

The subject of the present invention is a method of producing, properties and applications of crystalline metallic nano-particles (nano-crystallites) and colloids thereof manufactured using an electrical, non-explosive method of degrading metals and their alloys as well as the crystalline metallic nano-particles (nano-crystallites) themselves, and in particular their shape, composition, structure and characteristic properties.

The crux of the present invention is the manufacture of crystalline metallic nano-particles (nano-crystallites) and colloids thereof using an electrical, non-explosive method of degrading metals and their alloys, the properties and applications of crystalline metallic nano-particles and colloids thereof, as well as the crystalline metallic nano-particles (nano-crystallites) themselves, and in particular their shape, composition, structure and characteristic properties.

Earlier patent applications by the same authors, in particular Polish Patent Nos. 365435, 371355 and 328182 describe an electro-explosive method of obtaining metallic colloids and their applications.

The present goal of the inventors was in creating metallic nano-crystalline structures (nano-crystallites) and their colloids using an electrical, non-explosive method of degrading metals and their alloys.

The significant characteristics of the subjects of the present invention have been defined in the attached patent claims.

Subject of the invention is a method of producing a colloid or its derivative, characterized in that the electrical conductor in the form of a solid is placed in a dispersion medium, subjected to electrical disintegration by a controlled current from a charged electrical condenser, wherein the process of electrical disintegration is non-explosive and the temperature of degradation of the conductor is lower than its melting temperature, and the electrically conducting substance forms the dispersed phase of the colloid produced. Preferably, the sizes of the nano-particles of the dispersed phase are contained in the statistical range from 20 do 80 Angstroms, and the sizes of the microparticles produced are larger than 80 Angstroms. The nano-particles of the dispersed phase typically may vary in size from 2 to 8 nm, with an average value of 3.5 nm, wherein they assume the shape of platelets with a typical thickness of 3-5 atoms. Preferably, the degradation time of the metal conductor lasts around 4-5 microseconds and a plasma channel does not appear around the conductor. Preferably, the fragments of the metal conductor produced are nano-crystallites with an atomic crystal structure identical to the input material, and the content of melted metal particles or metallic spheroids is less than 50%, and preferentially no more than 10%. Further preferably, the oscillogram of the current is sinusoidal, interrupted in time or during the second oscillation and is not a spike event. The electrical current density may be from 1 kA to 50 kA. The electrically conducting substance may be selected from a group containing chemically pure metals, metals contaminated with additives, alloys or solid-state mixtures of metals, alloys of metals and semiconductors or dielectrics. The dispersion medium may be a liquid, gas, dispersed gas (gas at low pressure), a combination thereof or a vacuum. The dispersion medium may contain at least one of the following components: water, gas, liquified gas, aerosols, gels, oils and organic liquids such as liquid hydrocarbons, crude oil, gasoline, fuel oil, heating oil, or a mixture thereof. The colloid produced containing nano-particles may be introduced into another medium, preferentially a liquid or a gaseous one, or a polymerizing substance. Preferably, prior to placement in the other medium, at least a portion of the initial dispersion medium is removed. The manufacturing process of the nano-particles or colloids may be performed manually or using an automated method and appropriate equipments. The process may be performed continually or intermittently. The electrical degradation may be performed in the target environment or in a colloid, preferentially obtaining one of the following systems: silver in vitamins, gold in sterile distilled water or physiological solutions, chromium-nickel in silicon oils, palladium in benzene or toluene, paraffin oil, crude oil or oil, silver and/or gold in an acetylsalicylic acid solution, silver in alcohol, gasoline, crude oil, refined oil or glycerine. The colloid formed may be non-ionic and/or stable and visible sedimentation does not occur in it.

Next subject of the invention are nano-particles of an electrically conducting substance, characterized in that they are non-ionic, crystalline fragments of an electrically conducting substance in the form of platelets with a typical size ranging from 2 to 8 nm, preferentially on average about 3.5 nm, and a typical thickness of about 3-5 atomic layers, preferentially with a homogenous metallic structure lacking chemical impurities and crystalline defects. Preferably, the electrically conducting substance is selected from a group containing chemically pure metals, metals contaminated (on purpose) with additives, alloys or solid-state mixtures of metals, alloys of metals and semiconductors or dielectrics.

Next subject of the invention is a colloid, characterized in that it contains:

a) a dispersed phase composed of nano-particles of an electrically conducting substance, in the form of non-ionic, crystalline fragments of an electrically conducting substance in the form of platelets with a typical size ranging from 2 to 8 nm, preferentially on average about 3.5 nm, and a typical thickness of about 3-5 atomic layers, preferentially with a homogenous metallic structure lacking chemical impurities and crystalline defects.

b) a dispersion medium being a liquid or a gas or a mixture thereof.

A colloid according to the invention may be additionally dispersed in a gas, liquid, vapour or a mixture thereof, or in a polymerizing substance or a polymer. Preferably, electrically conducting substance is selected from a group containing chemically pure metals, metals intentionally contaminated with additives, alloys of metals, alloys of metals and semiconductors or dielectrics, or pseudoalloys. Preferably, the electrically conducting substance is a precious metal or its alloy.

A colloid according to the invention may be one of the following systems: silver in vitamins, gold in sterile distilled water or physiological solution, chromo-nickel in silicon oils, palladium in benzene or toluene, naphtha, crude oil or oil, silver and/or gold in an acetylsalicylic acid solution, silver in alcohol, gasoline, crude oil, or refined oil.

Next subject of the invention concerns a use of nano-particles according to the invention or a colloid according to the invention, as defined above, in the manufacturing of products selected from amongst: pharmaceutical agents, household chemicals, industrial chemicals, agricultural agents and veterinary agents. Preferably, pharmaceutical agents are manufactured using a colloid containing a precious metal, preferentially silver, copper or gold or an alloy of the above metals with an addition of at least one substance selected from among gold, palladium, platinides, copper and other non-precious metals. The pharmaceutical agent produced may be a preparation selected from among: antibiotics, antifungals, antivirals, anti-tumour preparations, and preferentially selected from among disinfectants, decontaminants, prophylactics or treatments. The preparation produced may be in the form of an aqueous suspension containing nano-particles of silver, its alloys or other metals.

Next subject of the invention concerns a use of nano-particles according or a colloid according to the invention, as defined above, in the manufacturing of electronic materials, in particular electrically-conducting glues, inks for printing electrical circuits, and elements of passive electrical circuits or greases for electrical contacts.

Next subject of the invention concerns a use of nano-particles according or a colloid according to the invention, as defined above, in the production of paints, varnishes, fillers—putty, and other coatings or fillers with the following properties: antibacterial, antifungal, antimold, antiviral and anti-electrostatic, or ones absorbing electromagnetic or ionizing radiation. Preferably, a colloid or its derivative contain a metal being an efficient electrical conductor, preferentially copper and its alloys.

Next subject of the invention concerns a use of nano-particles according or a colloid according to the invention, as defined above, in the manufacture of fuels, lubricants, enhancing additives thereof or catalysts for the enhancement and purification in fuel combustion such as: hydrocarbons or space rocket fuel. Preferably, a colloid or its derivative contain a platinide.

Next subject of the invention concerns a use of nano-particles according or a colloid according to the invention, as defined above, in the manufacturing of a preparation for decontamination, disinfection, prophylaxis or treatment, for use in particular in one of the following disciplines: dermatology, eye medicine, laryngology, urology, gynaecology, rheumatology, oncology, surgery, veterinary medicine, dentistry, in particular in the treatment of halitosis, plant protection, food technology, in particular in the conservation and disinfection of food preparation and storage equipment, etc.

Due to their unique properties, nano-particles according to the present invention can find numerous applications, particularly in the manufacturing of preparations for: conservation (e.g. of food or beverages); for purifying water; for non-antibiotic growth stimulants; for the internal and external antibacterial, antiviral and antifungal protection of eggs (particularly chicken eggs), especially against various bacterial infections of *Salmonella, Escherichia*, (e.g. *E. coli*), *Pseudomonas, Staphylococcus* (e.g. *S. aureus*) and *Streptocus;* antibacterial, antiviral and antifungal protection of animal farms; antibacterial, antiviral and antifungal protection and/or production of textiles, clothing, footwear, synthetic and natural materials, construction materials, paints and varnishes, wound dressings, dietary supplements, nutrient supplements, washing and ironing preparations, chewing gum, sweets, food, cosmetics, toothpaste, mouthwash, dressings, sticking plasters, gel dressings, gels, hygienic pads and tampons, gauze, cotton, diapers, bandages, feed supplements, water additives, beverage additives, beverages, medical and veterinary preparations, immunostimulatory preparations, energy drinks, gels and pastes; in the manufacturing of polymer or cellulose antibacterial foils; in the manufacturing of antibacterial packaging and containers; in the manufacturing of superconductors; in the manufacturing of photographic films, photosensitive materials and photosensitive arrays (e.g. LCD-type); in the manufacturing of protective preparations for plants; antibacterial, antiviral and antifungal protection of public spaces; production of paints and varnishes and coatings which reflect or absorb electromagnetic radiation, particularly microwaves; in the manufacturing of cosmetic and personal care preparations e.g. rejuvenating preparations; in the manufacturing of anti-inflammatory and anti-rheumatoid preparations; in the manufacturing of orally administered preparations, both those meant for ingestion as well as those for oral rinsing, preparations in the form of liquids, lotions and gels and solid preparations; in the manufacturing of injectible preparations; in the manufacturing of preparations for aiding healing; in the manufacturing of antibacterial, antiviral and antifungal preparations or ones possessing combined properties, e.g. antibacterial-antifungal, antibacterial-antiviral, antibacterial-antifungal-antiviral; in the manufacturing of preparations for use in veterinary medicine, animal care and rearing; in the manufacturing and conservation of beverages; in the manufacturing of filters, including cigarette filters; in the manufacturing of antistatic preparations and materials; in the manufacturing of photovoltaic and electrovoltaic cells; in the manufacturing of batteries and accumulating batteries; in the manufacturing of preparations containing an electrically conductive material or its alloy, which may contain other additives, in the form of nano-particles; in antibacterial and antifungal applications (medicine, sanitization, disinfection, applications requiring bactericides or fungicides, antibacterial and antifungal prophylaxis, plant protection, domestic animal protection, food conservation, cosmetics, wound dressings, antibacterial wound dressings, medical and cosmetic gels, wound dressing and regenerative gels (i.e. for burns), safety and conservation of food products, in particular easily spoiled goods such as eggs and their derivatives, ice-cream, mayonnaise, cheese, fish, seafood, meat (in particular ground meat) fruits and vegetables, water and beverage additives, diet supplements, cosmetics—creams, gels, lotions, tonics, pastes, liquids and soaps, as well as household products—additives for laundry and ironing, washing up, washing, protection of textiles, conservation of footwear, disinfection of spaces and surfaces, disinfection and protection of agricultural enterprises including animal inventory, protection of the body and feet, protection of plants, in particular fruit, vegetables and flowers, nanobiotics, disinfection, and purification of water; in the manufacturing of immunostimulants, food supplements, fuel additives for increasing their energy yield and shelf-life, fuel additives for decreasing the pollutants produced during combustion, lubricant additives for improving their mechanical properties, antiviral agents; to be applied as "enhancers" for improving material the properties of various materials (those substances to which they are added); in the manufacturing of next generation products, such as anti-bacterial foils; in the treatment of bacterial, fungal and viral infections; in the manufacturing of electrically conductive substances such as paints, varnishes, foils and coatings; for use as antistatics in polymers such as nylon, polymer, fibrous materials for use in textiles; and in the production of antistatic fibres.

BRIEF DESCRIPTION OF THE DRAWINGS

To better illustrate the nature of the present invention, the description has been supplemented with the following figures:

FIG. 11 is a highly magnified (100,000×) photomicrograph of a dark field diffraction pattern generated by electrons belong to the first diffraction ring appearing in FIG. 10A.

FIG. 12A is a high-resolution image of nanoparticles on a carbon holding film.

FIG. 12B is the same field shown in FIG. 12A, modified by a Fourier transformation, particle areas being marked for clarity.

Figure 1A:
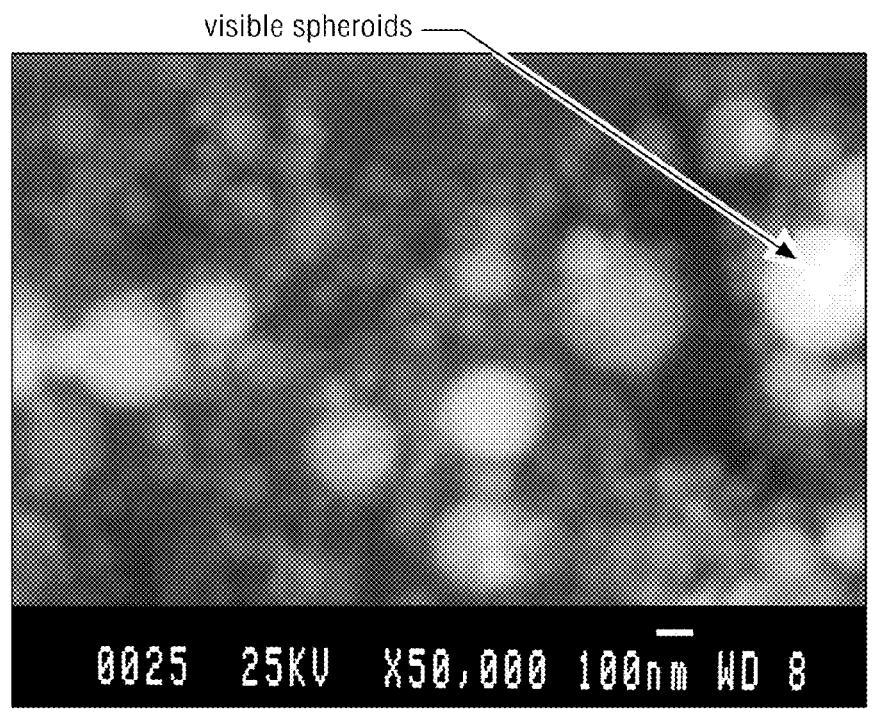
FIGS. 1A-1D are photographs which show images of metal fragments produced using explosive metal degradation. (SEM—Scanning Electron Microscope, 20,000-60,000× magnification). Spheroids with diameters of about 200 nm and about 50 nm are visible.
Figure 1B:
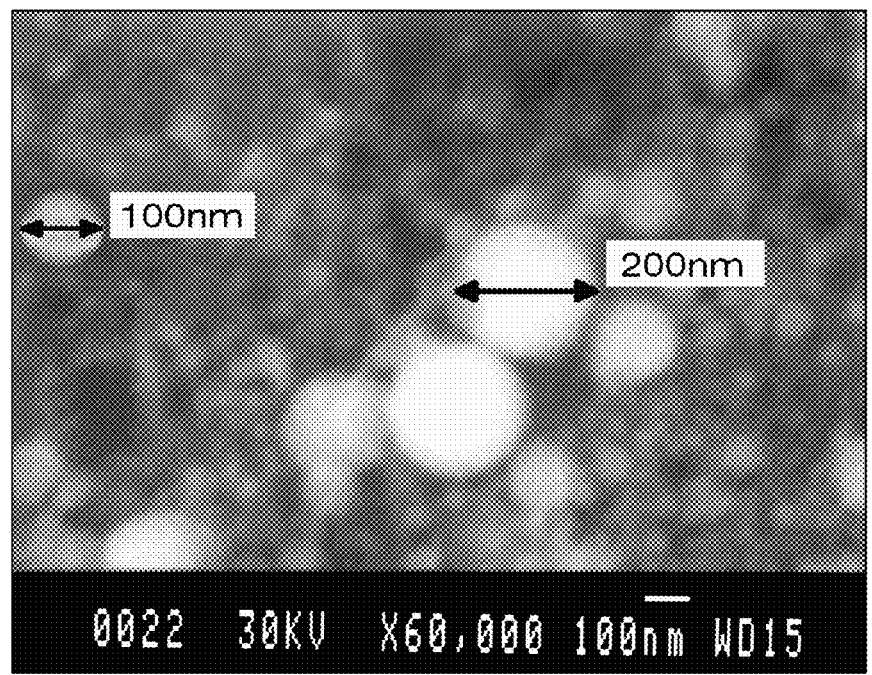
Figure 1C:
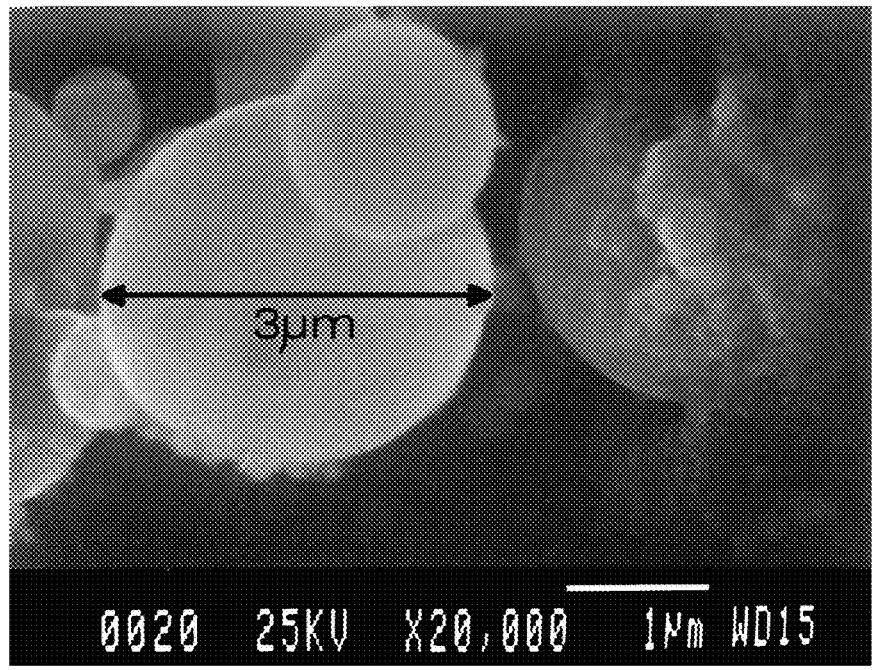
Figure 1D:
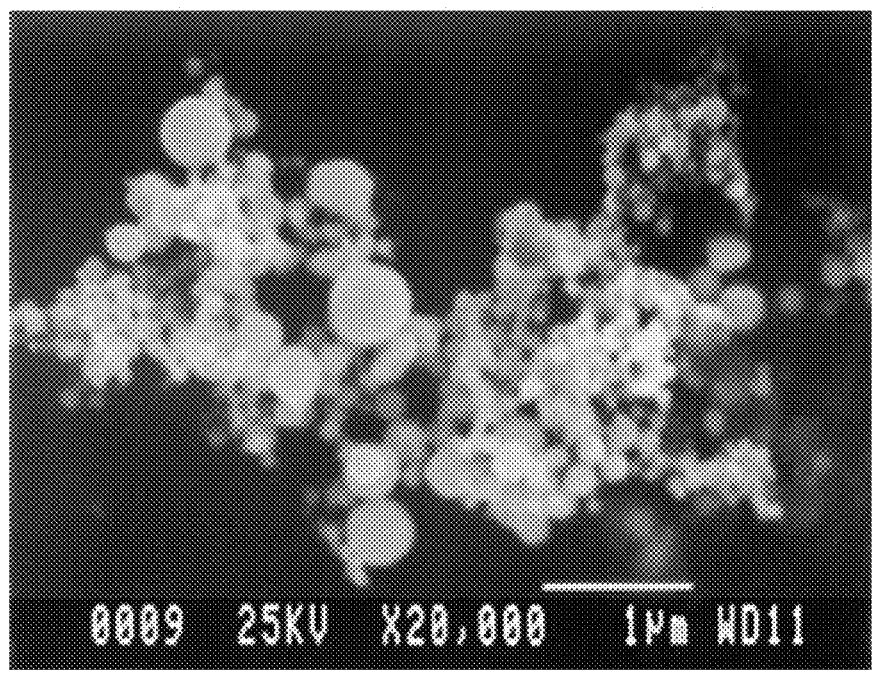

The non-explosive method of metal and alloy degradation according to the present invention turns out to be better and more effective than the known, explosive method of metal (wire) degradation. Use of the non-explosive method produced nano-crystallites and their non-ionic colloids with highly desirable physicochemical and utilitarian properties, whereas the non-explosive degradation process of metals (being the subject of the present application, is a great step forward in the amelioration (improvement) of nano-particle production, in relation to the explosive method.

The literature regarding the explosive behaviour of wires treated with electrical current is very extensive. The phenomenon of the explosive degradation of wire has been known since Faraday's time. As early as in the XIX century, it was noted that a high-density current causes the violent disintegration of a conductor. Thus, at a comparatively early stage of electrical and material studies during the XIX century, the melting (softening) currents of metals were determined. It turned out that under the influence of high-amperage direct currents, most metals undergo rapid softening. This occurs when the internal, electrical charge potential measured per centimeter of length of the conductor is about 0.5 volts. It was measured that in the case of silver which was the best known electrical conductor (specific resistance 1.63 micro Ohms× cm) under a charge of barely 0.5 volts (per cm length) the electrical current reaches a charge density of about 300,000 A/cm2. Under the influence of such a great charges, the conductor softens and melts. Rapid melting of metals occurs particularly at the junction of two conductors, since it is there that most Jule heat is produced. Metal melting under the influence of strong currents occurs mainly at junctions. This effect has found many applications in welding techniques, known as contact welding or resistance welding.

An electric current of a high density delineates the lower electrical boundary of metal stability. However, intensive external cooling of the metal results in an increase of the critical currents mentioned herein. Thus, to achieve melting in a metal rapidly cooled by air, water, liquid nitrogen etc. one requires much larger current densities than those found in electrical engineering texts (handbooks) as melting currents of metal. The authors' experiments showed that even with the most efficient metal cooling, current density may not be infinitely increased. In authors' experiments, a thin silver foil was cooled with a stream of liquid helium. It was observed that despite such effective cooling, short electrical impulses of high-density current cause an explosion. Thus, in conclusion, the upper bounds of electrical metal stability were determined for each metal known. Both of the above terms are introduced here by the authors of the present invention. The very existence of the upper and lower boundaries of electro-stability has an important, though often overlooked empirical significance in both: physics and electrical science.

As a result of research performed by the authors, it was determined that: "Each metal is capable of conducting electricity up to an a priori determined critical level of current density". The metal explodes after this upper boundary is exceeded, as determined empirically.

In practice, we rarely use metals immersed in the liquid cryogenic substances such as $LN_2$ or $LHe_2$. Electrically stimulated metal degradation processes in water or organic liquids are more typical, since they are technologically successful. These have found practical application in the production of colloidal materials or nano-particle preparations.

Significant meritorical errors were made from the outset in the research meant to elucidate the mechanism of exploding wires. These errors were the result of the application of the Classical Electrodynamics of Maxwell. Dr. Grenau Sr. of MIT in the USA became an acknowledged propagator of this direction in research. The Drs. Grenau (Sr. and Jr.) undertook the approach of the so called longitudinal electrodynamic forces in order to explain the degradation of wire using. Such hypothesis were anchored in classical physics. Despite the fact, then, that lengthwise electrodynamic forces are not found in the mathematical equations of Faraday, Maxwell or Lorentz, the Grenaus maintained that such forces exist in nature and that it is possible to describe them by using the (modified) classical electrodynamics approach. We owe the discovery of the longitudinal forces in an electrical conductor to Ampere, however. For entire decades, the above mentioned longitudinal electrodynamic forces were mistakenly viewed as the explanation for the phenomenon of exploding metal. Meanwhile, starting in 1948, solid state physics reigned supreme. All of solid state physics is based in the effects of solutions to the Schrodinger quantum wave equation. Thus, in contrast to Grenau, in the modern age, physicists use quantum mechanics to solve problems dealing with, among others, atomic and molecular events connected to current flow in metals. In Poland, the subject of explosions of wire was studied by professors: Nasilowski (Instytut Elektrotechniki w Warszawie—Miedzylesiu), Jakubiuk (Politechnika Gadanska), and Walczuk (Politechnika Lodzka).

M J Pike-Biegunski, who performed his research for many years in the US, published there a series of papers dealing with the explosive degradation of wires (also called "rozpadem prążkowym" in literature). (Literature 1,2,3,4). After 1997, in Poland, M J Pike-Biegunski published reports on the topic of the explosive degradation of wires (Literature 5,6,7). He also submitted a series of inventions to the American and Polish patent offices (Literature 8,9). In describing the phenomenon of wire explosions, M J Pike-Biegunski used a quantum model. In this area, M J his monograph (Literature 5) was the first attempt in the world to view this phenomenon in these terms, and likewise the technologies of producing nano-materials based on it.

Longitudinal Forces and the Explosive Degradation of Wires:

In the literature cited, published in Poland in 2001, it is shown that longitudinal forces occur in every conductor under the electrical current flow. Such forces are strictly quantum mechanical in character. The source of the longitudinal forces in metallic conductors is explained therefore in transfer of electrons which are colliding with the crystalline lattice of the conductor (phonons) as well as with impurities and structural metal crystal defects.

Conductor Explosions as a Source of Nano-Particles:

Metallic conductors subjected to the high-density currents "break up into fragments". This occurs when forces resulting from the collisions with metal ions exceed metal cohesive forces. The degrading metal forms an immense number of microscopic metallic fragments. The technique in which such a degradation takes place in a liquid medium is of particular practical importance. Metallic fragments formed as a result of this new technique may reach the nano-particle size and be characterized by a very large surface area. In numerous experiments, the authors of the present invention produced nano-particles originating from a number of precious and non-precious metals and alloys. Resulting from such experiments particles in colloids underwent structural and biocidal testing.

Explosive Production of Nano-Particles:

The explosive degradation of wire facilitates a relatively simple means of producing metallic nano-particle materials. However, this seemingly well known process is marred by a number of considerable, negative consequences. At first such disadvantages stem both from numerous undesirable properties of the product itself; as well as from the manufacturing process safety. Analysis of wire explosions shows the following undesirable factors:

1. It is impossible to control temperature within the explosion zone and the conductor itself, since plasma is formed in the explosion channel.
2. As a result of plasma activity, the metal fragments ejected from the conductor undergo melting where after such metal fragments are rapidly cooled in a liquid.
3. Plasma causes oxidation, thus significantly degrading nanoparticles.
4. The melted fragments rapidly solidify in the liquid, thus forming spheroids.
5. Compared to other, more developed geometric shapes, spheroids have the smallest possible active surface area.
6. The appearance of plasma, in conjunction with metal degradation and melting causes explosions resulting in high energy wave phenomenon.

A typical wire explosion occurs in a small volume over a very short time. Here, considerable large energy is released. For example, an exploding 1 mm in diameter and 10 cm in length wire occupies a volume of 0.1 $cm^3$. The explosion volume examined photographically is about 10 $cm^3$. The energy of the discharged condenser at 5000 V is 125 Jules. The experiment shows that the time of explosion is very short and lasts usually a fraction of a microsecond. The forces of such an explosion reach many Megawatts energy level, contributing in a very large amplitude explosive wave. Such a "detonation" wave can destroy even a thick-walled stainless steel reactor. Of course, the industrial nano-particle production process requires a great number of repeated explosions which have to occur in a short time. That in turn may lead to the catastrophic manufacturing equipment destruction. It is noteworthy that to be economically viable and effective, the successive explosions should occur on average at every 1 to 10 seconds. This in turn results in a great number of explosions per hour, day, week, month, etc. constituting in quick degradation and safety of the manufacturing equipment.

Figure 2:
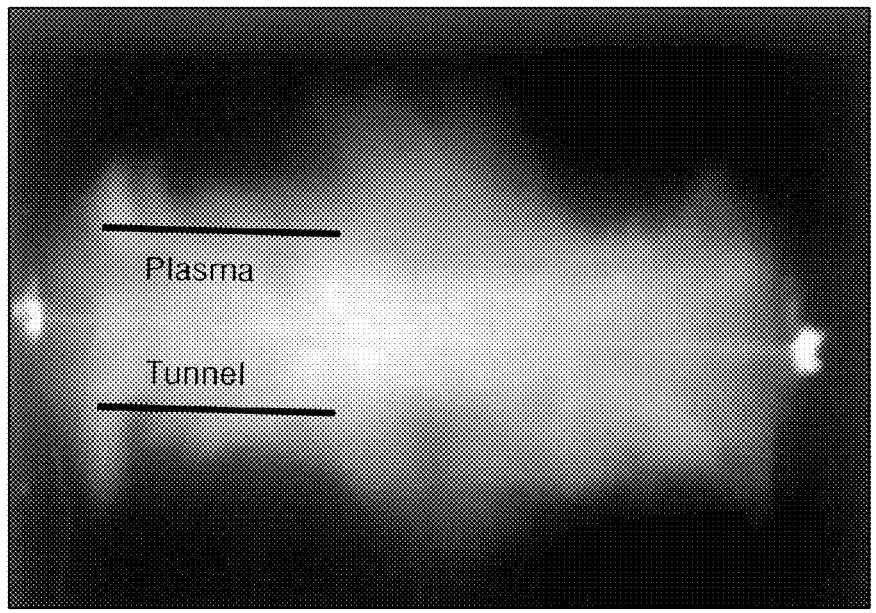
FIG. 2 is a direct photographic image of the reactor in which explosive degradation of wire was performed. The plasma region is visible in the photograph and illustrates explosive degradation of wire with a visible plasma channel.
Figure 3:
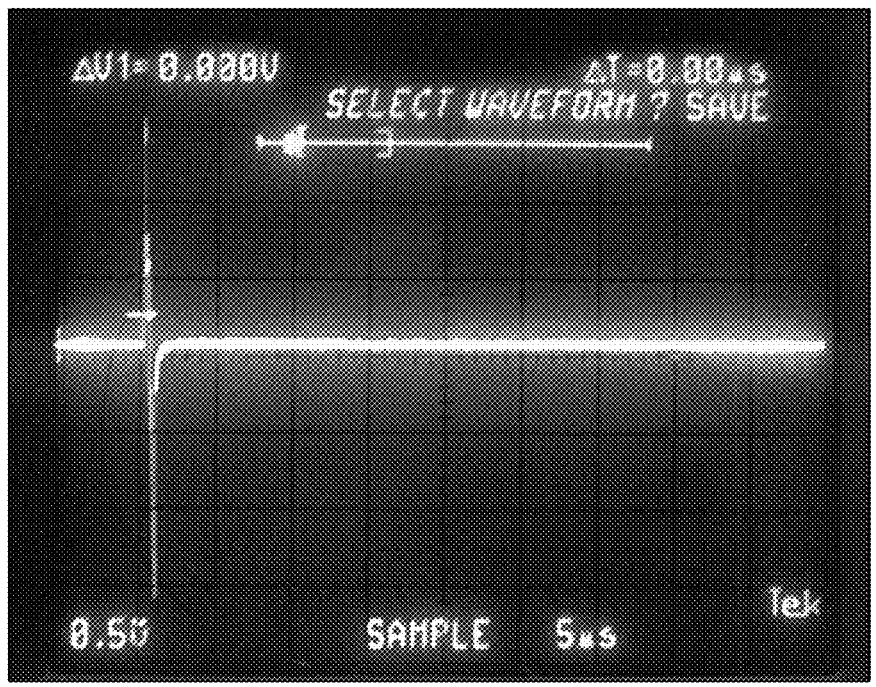
FIG. 3 is a photograph of an oscilloscope readout of the (oscillograph) condenser current charging the circuit in which the explosive degradation of wire occurs. Current amperage as a function of time is independent of the RLC value in the circuit. The oscillogram presents a "spike surge" which occurs very briefly in conjunction with the time constant of the LC circuit. The oscillogram is of an explosion which lasts for less than 0.5 microseconds.
Figure 4:
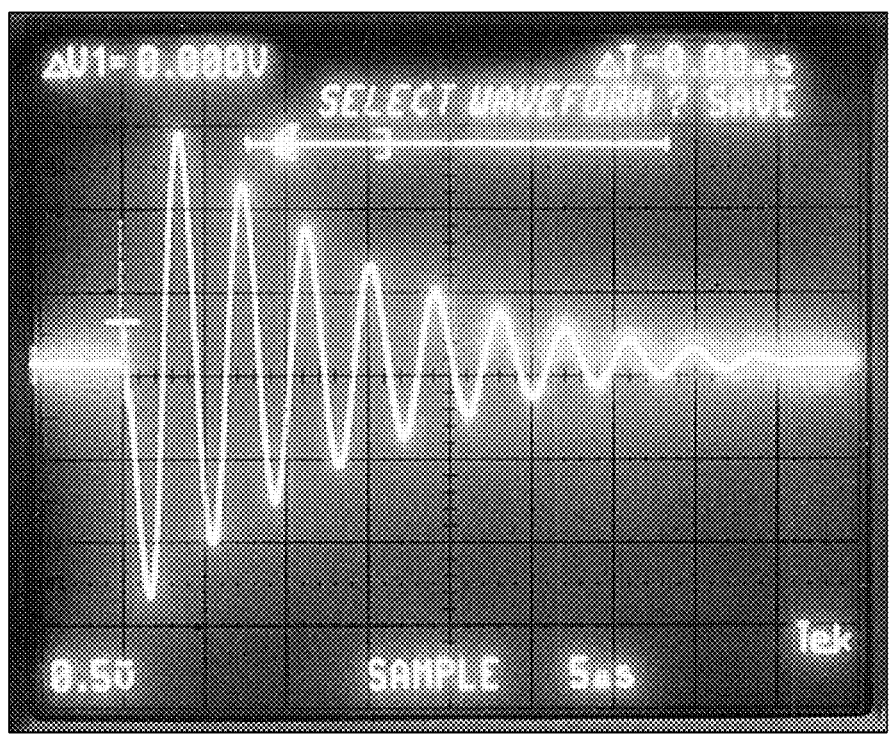
FIG. 4 is a photograph of an oscillogram of a condenser current discharged via a jumper. Condenser current amperage is dependent on RLC circuit constants. This oscillogram shows the graph of a current altering sinusoidally with an exponentially decreasing amplitude. The oscillation frequency is the known function of induction (L) and circuit capacity (C). This is a "template" oscillogram of a current obtained from a condenser closed off with a "jumper" and shows an oscillation period of about 4 microseconds.

It is worth mentioning that the commonly used explosive processes of nano-particle making utilise use only a small fraction of the energy originating from the current source. A great surplus of energy is wasted since it is released into the wire containing liquid. The first deleterious effect of such an explosive nano-particles production is the appearance of spheroidal metal particles. This material appears in plasma through melting of the wire fragments. Fragments of this type are illustrated in the photograph made by using SEM (FIGS. A,B,C and D). Another undesirable side effect of such a production process is the appearance of plasma itself which causes the detonation in the reactor (FIG. 2). It turns out that both these factors exert a considerable, highly negative effect on the structure and shape of the nano-particles produced. As a result of the occurrence of the above mentioned effects, the active surface area of the obtained products is greatly reduced and the nano-particles themselves exhibit re-melted structures with spheroidal shapes and of an unpredictable atomic structure. The contact of plasma with a liquid medium (water) causes a detonation, thus producing waves with considerable energy. FIG. 3 shows an oscillogram of the current accompanying the wire explosion. It shows that such an oscillogram shows a "spike event" characterised by the fact that a great electrical current flows through a wire in an extremely short time and that the plasma channel is appearing around it. The force of such a current event released into the plasma channel is immense and amounts to many Megawatts. For comparison, FIG. 4 shows an oscillatory current graph of a diminishing amplitude. This oscillogram was recorded for the condenser discharge into a so-called "jumper" load.

Non-Explosive Particle Production

The subject of the present invention is the replacement of the explosive production process used hereto by a non-explosive process. In contrast to the explosive technique, the present invention facilitates a radical technology improvement. The non-explosive nano-particle manufacturing process differs significantly from the explosive process. This improvement is based on the greatly decreased energy used in the manufacturing process. In accordance with the intention of the present invention, electrical energy is released only into the interior of the metal. In this new arrangement of nano technology none of the following occur: plasma, melting, spheroid generation and detonation. As we pointed out earlier, the explosion occurs as the result of the interaction between hot plasma and the surrounding liquid. The temperature of the wire itself is also greatly decreased in the present invention. This temperature is purposefully much lower than the metal's melting temperature.

Figure 5A:
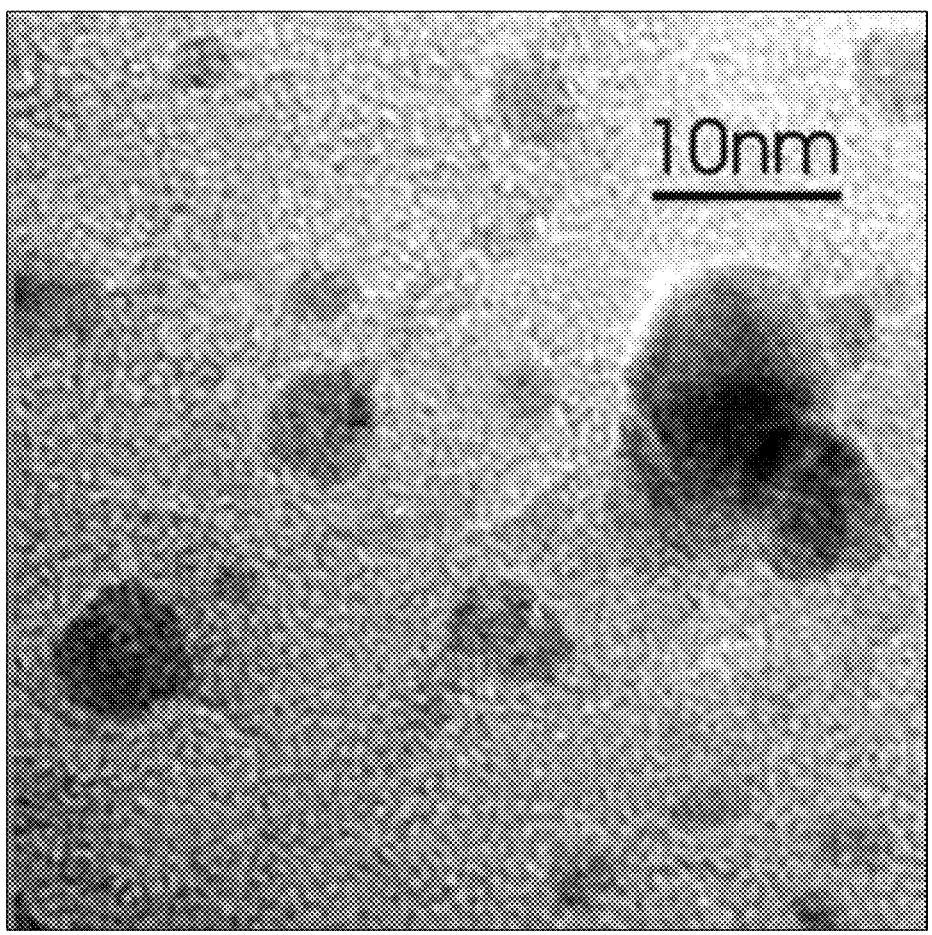
FIGS. 5A-5C are images of metal fragments produced via the non-explosive degradation of wire (TEM—Transmission Electron Microscopy). The silver platelets are so thin that the graphite substrate of the carbon substrate membrane is "visible" through them.
Figure 5B:
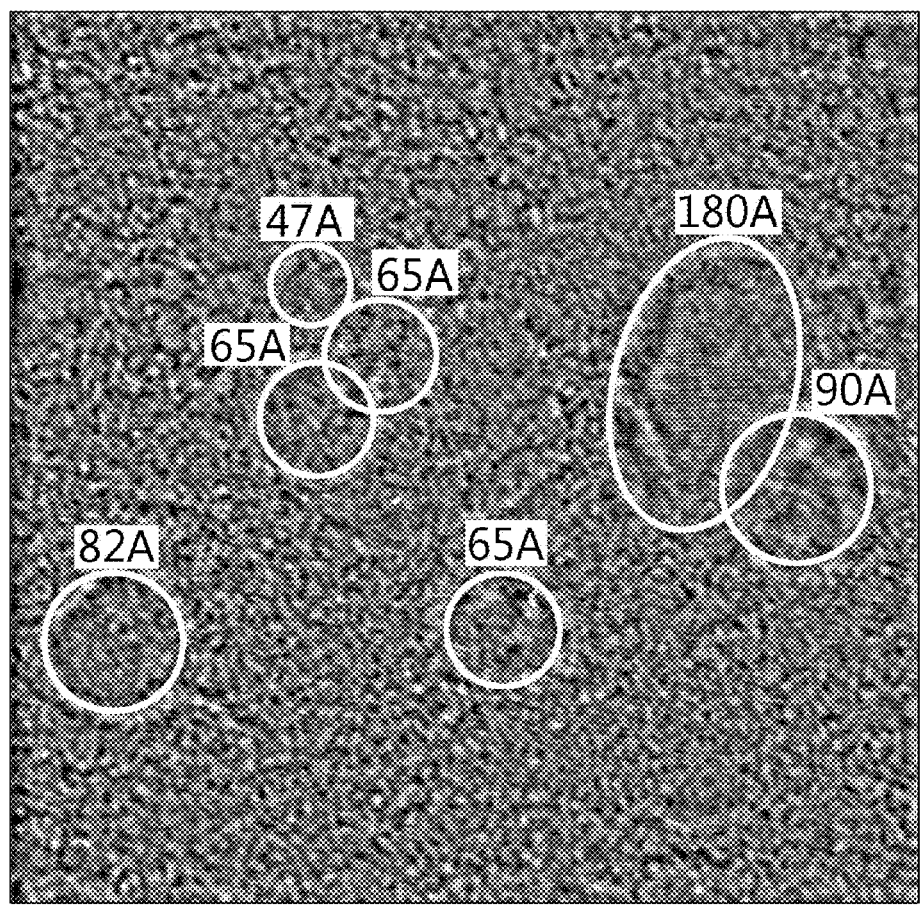
Figure 5C:
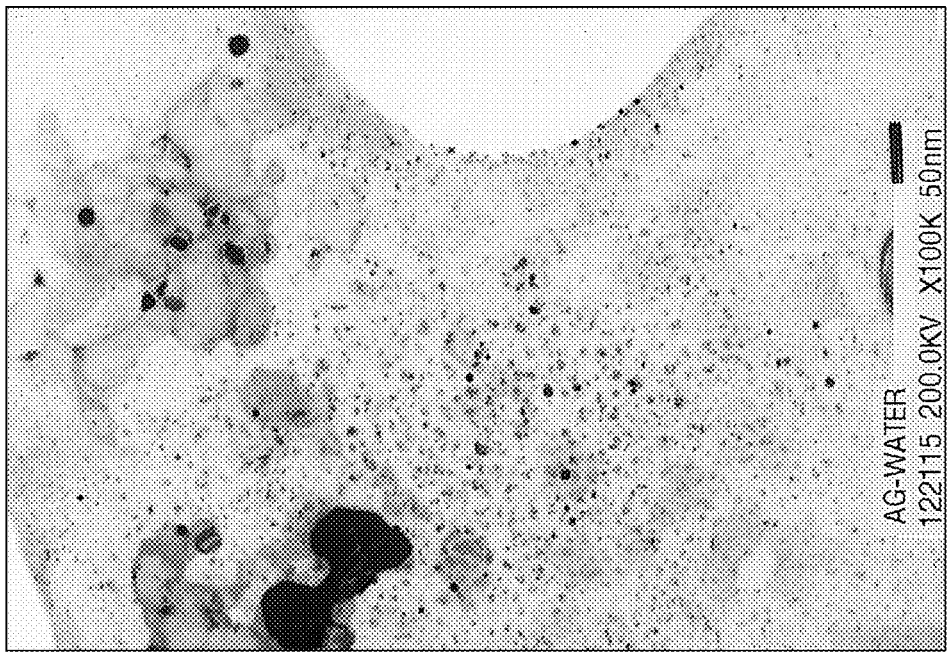
Figure 6A:
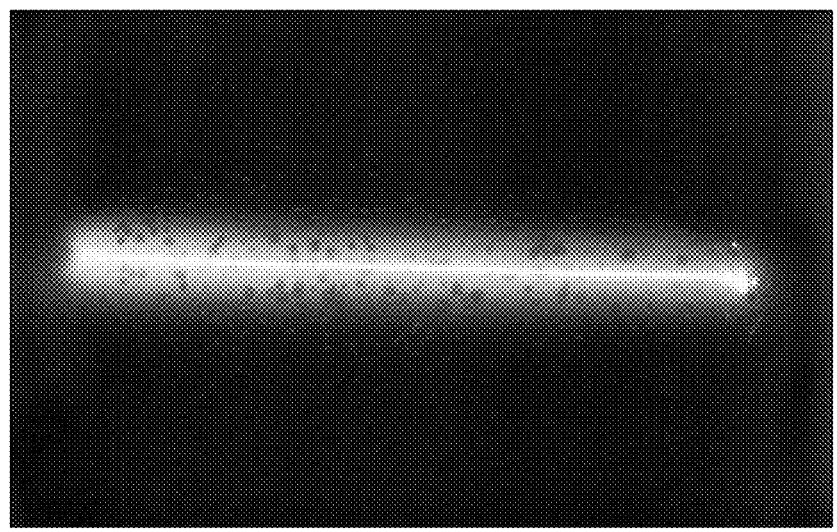
FIGS. 6A and 6B are photographs of non-explosive degradations of wire in a water reactor. The direct images are analog photographic records from a reactor in which the non-explosive degradation of wire was taking place. Plasma is not visible in the photographs. Tracks formed by metal fragments ejected from the wire are visible. A characteristic brush pattern occurs. Bubbles of water vapour and gasses dissolved in water (oxygen, nitrogen) are also visible, resulting from an ultrasonic cavitational effect.
Figure 6B:
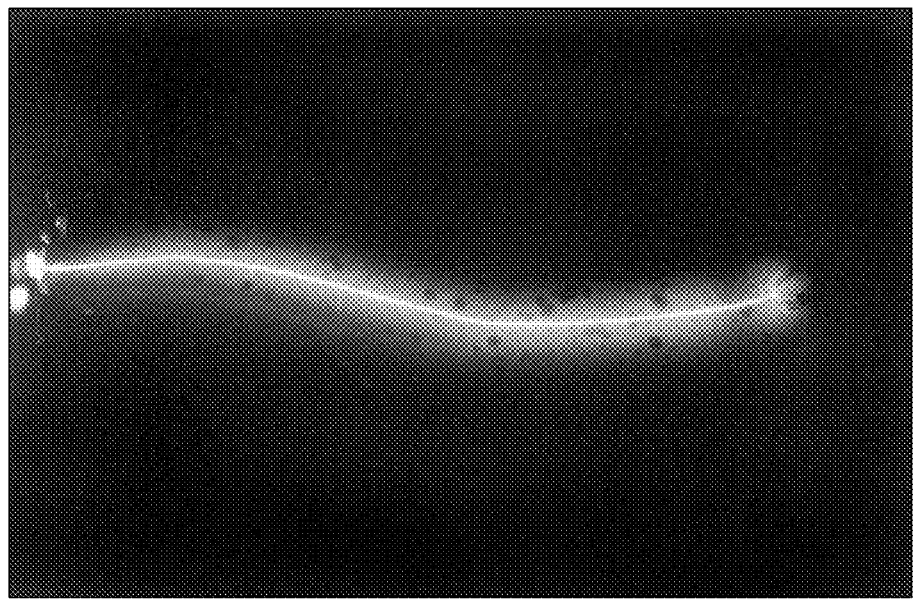
Figure 7:
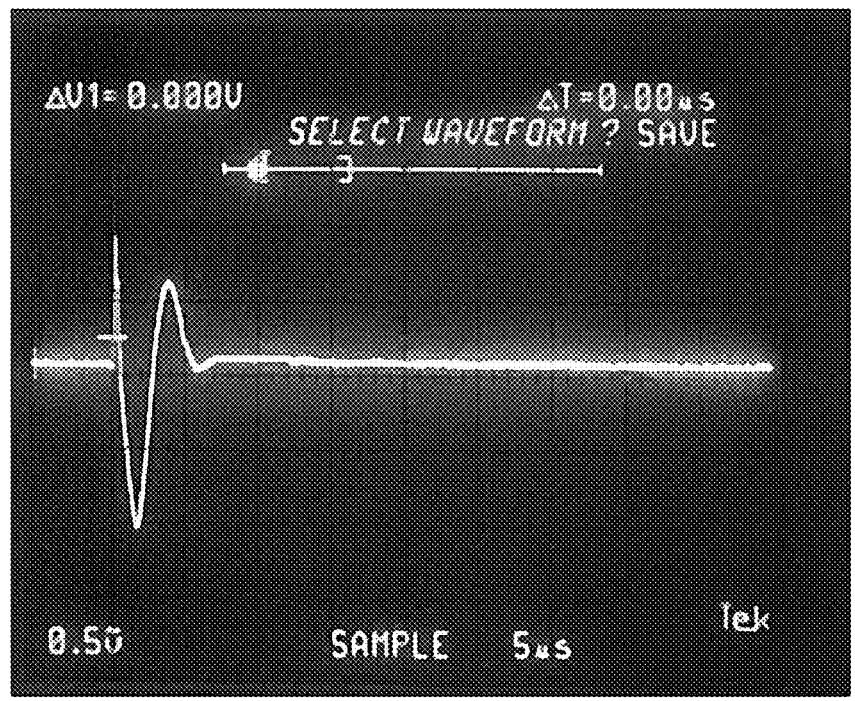
FIG. 7 is a photograph of an oscillogram of a current in connection with the non-explosive degradation of wire. In contrast to the oscillogram from FIG. 3, the current in this case is a root (square root) of the functions of the constant values of the circuit (RLC). The point at which the current is lost (time axis) corresponds to the time of degradation. The oscillograph of the non-explosive degradation exhibits a duration of the event of about 4-5 microseconds (compare to the explosion above, which is less than 0.5 microseconds).
Figure 8A:
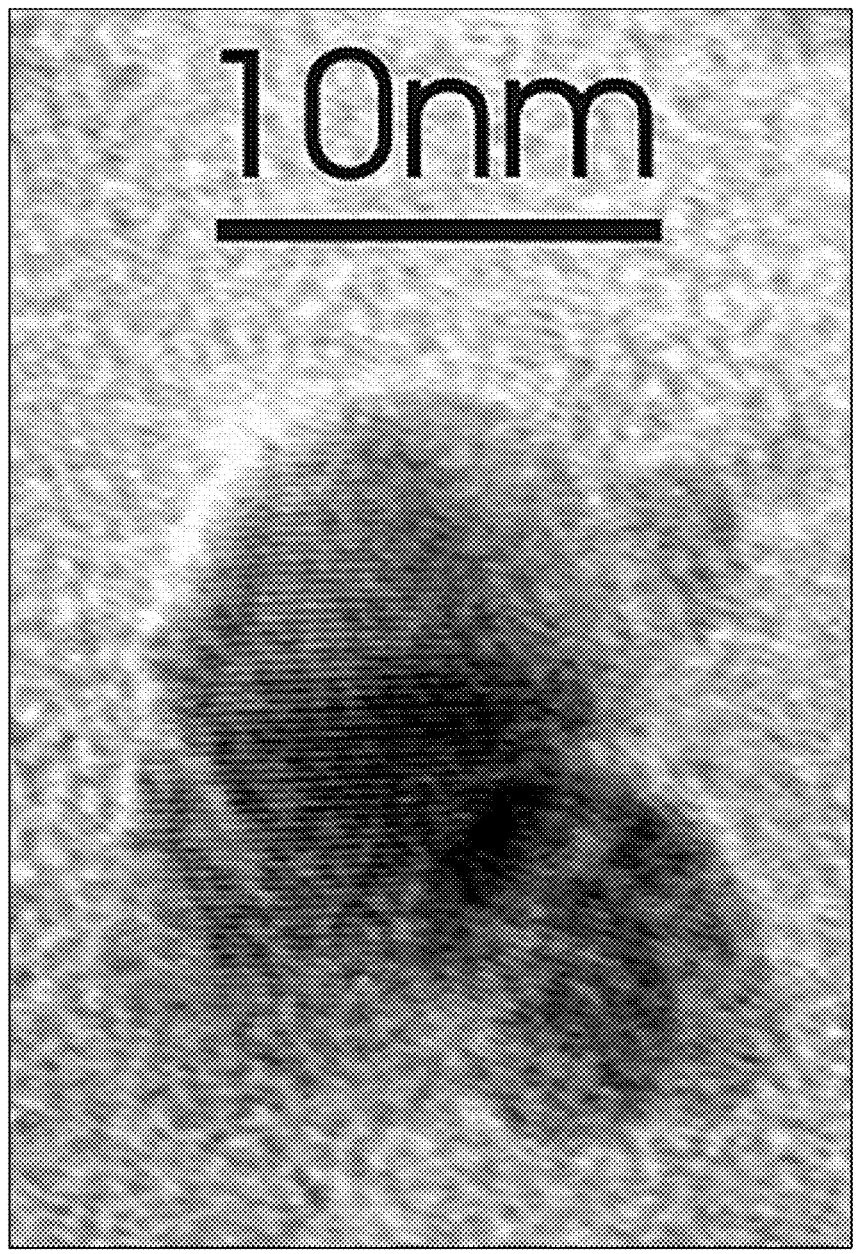
FIGS. 8A-8E are photographs of magnified crystalline metallic nano-particles (nano-crystallites) using TEM Transmission Electron Microscopy. The silver platelets are so thin that the graphite substrate of the carbon substrate membrane is "visible" through them.
Figure 8B:
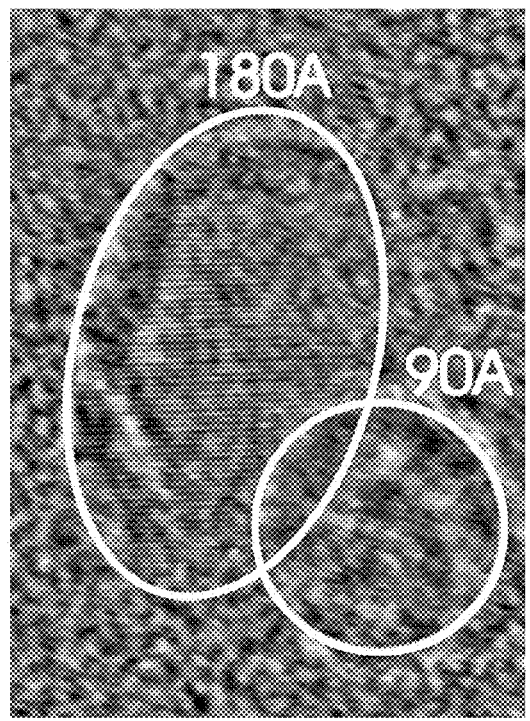
Figure 8C:
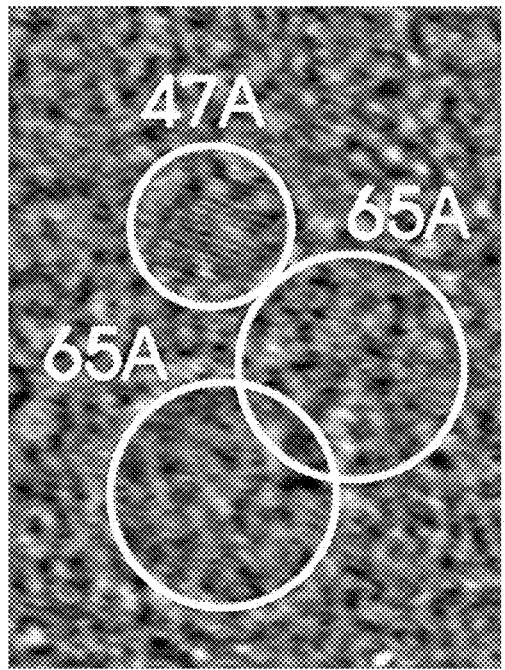
Figure 8D:
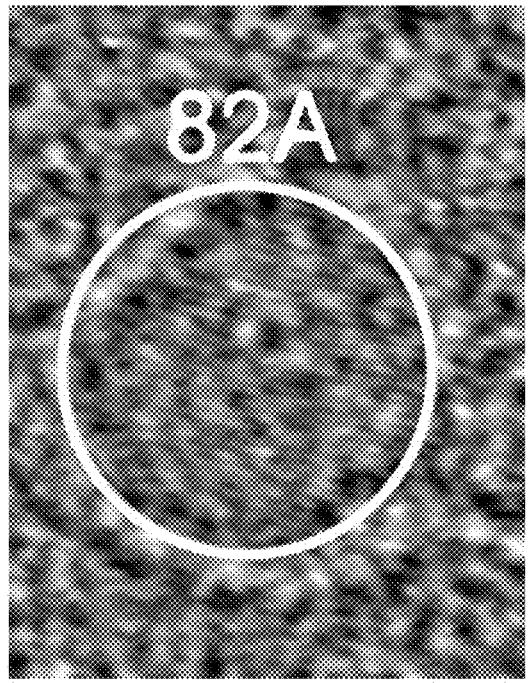
Figure 8E:
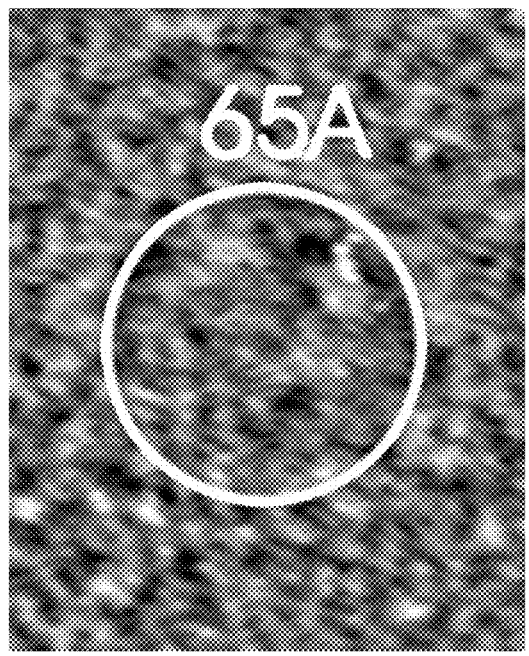

To summarise this new discovery:

1. A plasma channel does not appear around the wire.
2. In the absence of metal melting, the fragments do not assume structural modification, and they do not for spheroids. The resultant metallic fragments retain their initial, metallic molecular structure identical to that of the virgin wire.
3. The geometry of the resultant nano fragments is flat (platelets or flakes), and the atomic structure is crystalline, FCC.
4. The active surface of this new product is also increases by many folds.
5. Since the temperature of the manufacturing process is radically reduced, the degree of oxidation among the particles is marginal.
6. No explosions occur in the reactor, and during the manufacturing process.
7. FIG. 5A presents a TEM image of silver fragments formed non-explosively. This image demonstrates small, flat metallic structures only several atoms thick, nearly transparent to the electrons in TEM, the electron transmission microscope. The silver atoms are arranged in parallel rows (FCC crystalline structure). The diameter of such nano particles is on average only a few nanometres. (1 nm is about 3-4 intra-atomic distances). The active surface area of the nano preparations according to the novel technology reported here is over 100 m$^2$/g (square meters per gram of metal used). Attached is a report from the Institute of Physics of the Polish Academy of Sciences, Literature 8. FIGS. 6A and 6B show photographs of the degradation of wire in the reactor. A wire is visible emitting metallic fragments forming a characteristic brush image. FIG. 7 shows an oscillogram of the non-explosive degradation. Here we see, that this oscillogram represents only a curve section of the natural discharge of a condenser through a jumper, in contrast to the oscillogram showed previously, see FIG. 4. As can be seen, during the non-explosive degradation of the wire, the condenser discharge current exhibits only the initial oscillation fragment shown in FIG. 4. This is explained by the fact that in the case of a thin wire, during the first oscillation the conductor is fragmented and the discharge circuit is broken, therefore the electricity ceases to flow. The absence of plasma does not allow further oscillations to be sustained through the plasma channel. It is also visible on the time axis that at the point at which the graph breaks off the wire degradation process is finished. The duration of such a novel, nonexplosive process lasts typically about several microseconds.

As a result of the application of the present invention a radical improvement in the product quality is achieved. In particular, desirable biocidal properties are greatly improved. Such properties are connected with both the atomic structure of the formed particles and with the active surface of the nano-preparation. TEM studies in this case show nano-particles exhibiting an FCC cubic structure characterized by several nanometer-range surface measurements. These particles are in the form of flakes barely several atoms thick. The nano-particle product formed has an immense active surface area. It should also be noted, that we have preferentially removed the danger of catastrophic reactor failure from the explosion typically assisting in the wire degradation process. Thus the safety of the process has been greatly increased.

Preferentially for the present invention, the amount of electrical energy delivered to the wire has been significantly reduced. Whereas energies in the range of several dozen to thousands of Jules are used in devices destined for the explosive degradation of wire, the present invention uses from a fraction of a Joule to several Joules of energy only. In the explosive method, the process duration is limited to fractions of microseconds. This time is independent of the RLC circuit parameters. In contrast and preferentially, in the non-explosive method, the degradation time is elongated and typically lasts from several to several dozen microseconds. The duration of the non-explosive degradation is a function of the electrical parameters of the RLC circuit. As was shown earlier in the explosive method, the temperature of the wire greatly exceeds the melting temperature of the metal. In the non-explosive method, this temperature is much lower than the melting temperature of metal. Table 1 presents e comparative data of process parameters used in the explosive method (EM) and the non-explosive method (NEM).

TABLE 1

Comparison of data compiled for both processes outlined above.

| Method: | EM | NEM |
| --- | --- | --- |
| Condenser cap. | 10 microfarads | 0.5 microfarads |
| Potential | 5000 Volts | 20 000 Volts |
| Duration | 0.5 microseconds | 5.0 microseconds |
| Conductor length | 1 meter, parallel line | 20 cm. axial line |
| Conductor type | (symmetrical cable) | (concentric wire) |
| Resistance | unmatched load resistance | matched load resistance |

EM—Explosive method
NEM—Non explosive method

A comparison of both production methods, explosive and non-explosive, thus demonstrates significant differences and novel advantages of the present invention. The present invention is based on the determination of radically new conditions for the degradation of wire under which all of the condenser's energy is used for the intended purpose. Thus, it is used to disperse the metal in a liquid. This eliminates deleterious side effects such as melting of metallic fragments, formation of plasma and detonation. Preferentially, the active surface area of the product formed is increased (at least two orders of magnitude). This amounts to over 100 square meters per gram of metal. Crystalline metallic nano-particles (nano-crystallites) and their parameters, particularly: shape, composition, structure and characteristic properties.

Crystalline metallic nano particles, called nano-crystallites by the authors are produced as a result of the non-explosive, electrical degradation of metal (for example silver, or gold wire).

The resulting application of this novel method of manufacturing nano-crystallites possess a very specific and characteristic structure and properties:

Nano crystallites produced according to the present invention take the shape of tiny leaves or flakes with regular sides (as in a crystal) and exhibit astounding thinness, on average of several atoms in dimension. Here, we speak specifically of the "flake geometry" of nano-crystallites.

Nano-crystallites possess the greatest achievable active surface.

Nano-crystallites produced according to the present invention are practically flat structures, since their "third dimension" is reduced to the minimum possible thickness, on average several atoms. This results in the least (practically) possible active surface which for silver is about 100 m$^2$ per gram.

Nano-crystallites, as described above, are very durable and stable. In the case of silver, they do not react with most chemical compounds, not even with most acids and royal water (aqua regia) is needed to dissolve them.

Nano-crystallites (including silver) are photostable, which means they do not react to sunlight. In particular, under sunlight, they do not undergo almost any chemical reactions.

Nano-crystallites, as described above, usually possess a diameter of about 35 Angstroms (see histogram) and a thickness of about 10 Angstroms. The non-explosive, electrical disintegration of metals and their alloys results in nano-crystallites of the above diameter, whereas the remaining 20% are larger, though of the same thickness. Nano-crystallites as above are practically "transparent" to TEM electrons.

Nano-crystallites, as above, due to their geometry (platelets) adhere extremely easily to most solid surfaces.

Nano-crystallites, as above, are mono-crystals. Each platelet forms a mono-crystal.

Nano-crystallites, as above, are free of all surface contaminants typical for a similar nano-particle products obtained via methods other than that described by the present invention, particularly by chemical production processes.

Illustrations: FIGS. 8A, 8B, 8C, 8D, 8E.

Summary of the characteristic properties of nano-crystallites:

1. mono-crystalline structure,
2. flat structure: flakes or platelets 3-5 atomic layers with regular atomic spacing (as in a crystal),
3. a majority (80%) is comprised of structures with a diameter of about 35 Angstroms (see histogram),
4. The highest achievable active surface, which for silver is about 100 m2 per gram,
5. a structure almost "transparent" to electrons in TEM,
6. free of surface contaminants,
7. highly durable and stable, in the case of precious metals these undergo (practically) no interactions with most chemical compounds,
8. highly "adhesive" to most surfaces,
9. no photoreactivity (no photographic effects typical of silver and its compounds). FIGS. 8A-8Ee are photographs of flat nano-particles.

The characteristics of the product obtained in this novel method were also studied by the Electron Microscopy Laboratory of the Institute of Environmental Radiography and Electron Microscopy Laboratory of the Polish Academy of Sciences in Warsaw.

The preparation for TEM consisted of pipetting two drops of the "Nano-Silver 04-21-06" liquid onto a copper grid (3 mm diameter) coated with a perforated carbon membrane (No. S147-4H, Agar Scientific). The estimated volume of one drop was 14 µl (volume of a 1.5 mm sphere).

The studies were performed using a JEM2000EX TEM using a 200 keV electron beam. Images were recorded on photographic film which was then scanned on a Super Colorscan 8000 from Nikon. Diffraction images were scanned at 1000 dpi whereas high-resolution TEM images were scanned at 4000 dpi. Contrast resolution was 14 bits. Scans were recorded in the TIFF6.0 format.

The TEM images showed crystalline particles settled on the carbon holder, the matrix. There was a clear division of particles in two size ranges: micron-sized and nanometer-sized.

Diffraction images (FIG. 1a) of the micron particles showed "point" reflections arranged in concentric rings. The diameters of these rings were measured and compared to standard values corresponding to the structure of crystalline silver.

Table 2. The first column of the table gives the respective ring number beginning with the ring with the least diameter, the second column contains ring diameters empirically derived from the TEM images, the third column contains standard values of atomic spacing between the plains for the FCC crystalline structure of silver. (a=4,078 Å), the fourth column contains the product of the second and third column, the fifth, sixth and seventh columns contain Miller indices, whereas the last column represents the lattice constant calculated using the equation:

$$a = \frac{\sqrt{h^2 + k^2 + l^2}}{2r} D$$

where 2r is ring diameter (value of column 2), h, k, l are Miller indices (columns 5, 6 and 7), and D is the constant of the microscope camera with an average value of column 5.

| Lp. | 2r [mm] | d [A] | 2r * d [mm * A] | h | k | l | a [A] |
|---|---|---|---|---|---|---|---|
| 1 | 13.0 | 2.355 | 30.62 | 1 | 1 | 1 | 4.107 |
| 2 | 15.2 | 2.039 | 30.99 | 0 | 0 | 2 | 4.056 |
| 3 | 21.3 | 1.442 | 30.71 | 0 | 2 | 2 | 4.093 |
| 4 | 25.0 | 1.230 | 30.75 | 1 | 1 | 3 | 4.089 |
| 5 | 26.5 | 1.177 | 31.19 | 2 | 2 | 2 | 4.029 |
| 6 | 30.3 | 1.020 | 30.91 | 0 | 0 | 4 | 4.069 |
| 7 | 32.7 | 0.936 | 30.61 | 1 | 3 | 3 | 4.109 |
| 8 | 33.6 | 0.912 | 30.64 | 0 | 2 | 4 | 4.102 |
| 9 | 37.1 | 0.832 | 30.87 | 2 | 2 | 4 | 4.070 |
| 10 | 39.4 | 0.785 | 30.93 | 1 | 1 | 5 | 4.065 |
| 11 | 42.7 | 0.721 | 30.79 | 0 | 4 | 4 | 4.083 |
| 12 | 44.8 | 0.689 | 30.87 | 1 | 3 | 5 | 4.070 |
| | | Average | 30.82 | | | | 4.078 |
| | | | Std. Deviation | | | | 0.023 |

Based on electron wavelength, the constant D (λ=0.0251 Å) with an energy of 200 keV and a camera length of 60 cm is D=2*600 mm*0.051 Å=30.1 mm*Å.

Figure 9:
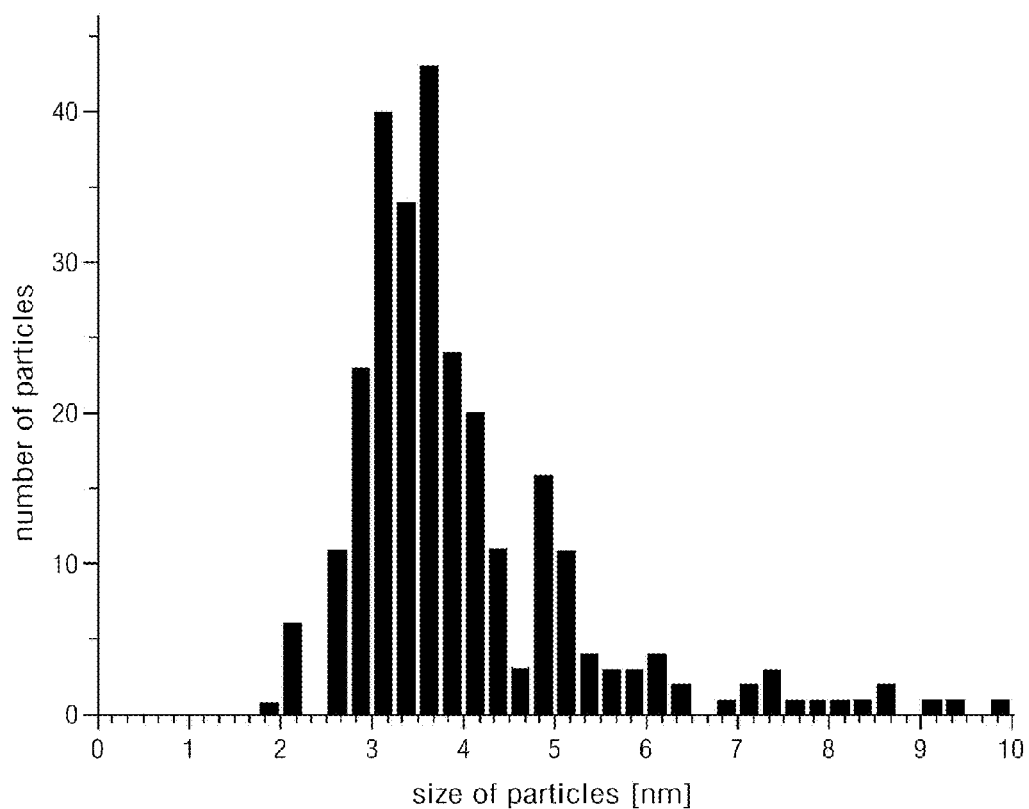
FIG. 9 is a histogram showing particle size distribution.
Figure 10:
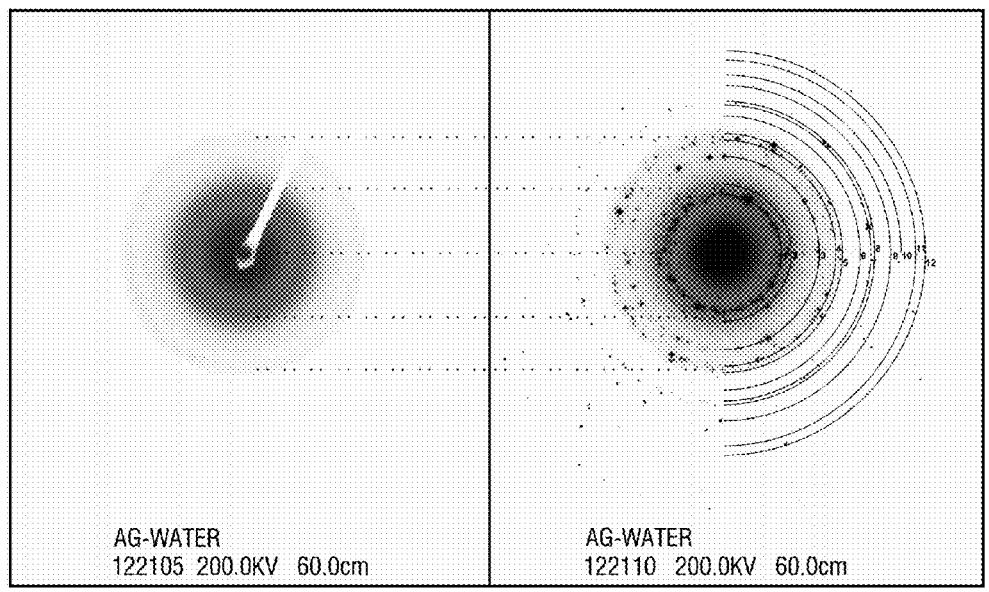
FIG. 10A is a diffraction image of nanometer-sized silver particles.
FIG. 10B is a diffraction image of micrometer-sized silver particles.

Diffraction images (FIG. 10A) from areas containing nano-particles showed two diffuse rings, whose radii correspond to distances between vertices with the Miller indices {111} and {222}. The occurrence of diffuse rings is evidence of the fact that the size of the diffusing objects is less than 10 nm. Nano-particle sizes were examined using TEM images and the dark field technique based on the electrons forming the first diffraction ring. The result was presented on a frequency plot of the occurrence of particles according to size. It was assumed that the particles are spherical. FIGS. 8B-8E present TEM images with overlaid rings, whose diameters were taken to be particle diameters. Particle sizes ranged from 2 to 8 nm, with an average value of 3.5 nm (see histogram, FIG. 9). A 400,000× magnified image (Rys.3) shows individual nano-particles with visible systems of parallel straight lines. The distances between the lines are indicative of type {111} silver. On this basis, it may be stated that the nano-particles have a defect-free, crystalline structure with centered vertices. Well-formed side surfaces can be observed in 18 nm particles.

The TEM studies showed that the studied liquid contains silver particles with an average diameter of 3.5 nm (see histogram, FIG. 9) and larger particles of several microns. The particles of both sizes possess a cubical crystalline structure with centered vertices and a lattice constant of a=0.408±0.002 nm. No structural defects, such as twinning, were observed for nanometer-sized particles.

Due to their unique properties, nano-crystallites and their colloids can find many potential applications. These applications are determined by the properties of metals (or their alloys) from which the nano-crystallites are produced. Example indicated applications are connected with the anti-bacterial and antifungal properties of silver and copper, as well as with the antiviral activity of platinides as well as their catalytic properties.

The use of precious and semi-precious metal nano-crystallites and their colloids encompasses: antibacterial and antifungal applications (medicine, sanitization, disinfection, applications requiring bactericides or fungicides, antibacterial and antifungal prophylaxis, plant protection, domestic animal protection, food conservation, cosmetics, wound dressings, antibacterial wound dressings, medical and cosmetic gels, wound dressing and regenerative gels (i.e. for burns), safety and conservation of food products, in particular easily spoiled goods such as eggs and their derivatives, ice-cream, mayonnaise, cheese, fish, seafood, meat (in particular ground meat) fruits and vegetables, water and beverage additives, diet supplements, cosmetics—creams, gels, lotions, tonics, pastes, liquids and soaps, as well as household products—additives for laundry and ironing, washing up, washing, protection of textiles, conservation of footwear, disinfection of spaces and surfaces, disinfection and protection of agricultural enterprises including animal inventory, protection of the body and feet, protection of plants, in particular fruit, vegetables and flowers, nanobiotics, disinfection, and purification of water particularly through the destruction of bacteria such as *E. coli, Pseudomonas* or *Streptococus*. Protection of consumable and agricultural eggs through inoculation with silver; production of bacteria-free eggs (i.e. *Salmonella*) and by the same token ones safe for consumers and with increased shelf-life. Production of antibacterial and antifungal paints, varnishes, and construction materials. Other applications are also possible, such as immunostimulants, food supplements, fuel additives for increasing their energy yield and shelf-life, fuel additives for decreasing the pollutants produced during combustion, lubricant additives for improving their mechanical properties, anti-viral agents, nano-biotics.

BIBLIOGRAPHY

1. M J Pike-Biegunski, Damages to Electrical Connections by Electrotensiometric Forces, 29$^{th}$ Annual Connector and Interconnection Symposium and Trade Show, Boston Mass., Sep. 16-18, 1996, pages 371 to 395. Proceedings.
2. M J Pike-Biegunski, Electromagnetic radiation from Termination Points of Metallic Conductor "Forty First Holm Conference on Electrical Contacts, October 2-4 Montreal, Canada 1995, pages 165 to 175. Proceedings.
3. M J Pike-Biegunski, Process for fabricating Diamond by Supercritical Electrical Current, U.S. Pat. No. 5,437,243 August 1995.
4. M J Pike-Biegunski, Electrical Conductance at Tin-Tin Interfaces under Stationary and In-Motion Conditions, 36th IEEE Holm Conference on Electrical Contacts, Montreal, Canada, August 1990 pages 232 to 247. Proceedings.
5. M J Pike-Biegunski, The Nonthermal Interactions Between Electrons and the Crystalline Lattice, Zeszyty Naukowe Politechniki Lódzkiej,-Elektryka z. 95 2001, strony 17 do 40. (język angielski)
6. M J Pike-Biegunski, Rozpad Wybuchowy Drutu, Przegląd Elektrotechniczny 1'99 (styczeń 1999) strony 11 do 15. (język polski) in translation: "On the Explosive Wire Degradation" The Electro Technical Review magazine, Poland
7. M J Pike-Biegunski, Zastosowanie Materiałów Nano Częsteczkowych w Medycynie i Farmacji, miesięcznik: Lek w Polsce: 3 kolejne artykuly nr. 9,10,11 wydania z roku 2005 in translation: On the Nano Materials Applications to Medicine and Pharmacy, Drugs in Poland magazine

We claim:

1. Nano-particles of an electrically conducting substance, wherein they are non-ionic, crystalline fragments of an electrically conducting substance in the form of platelets with a size ranging from 2 to 8 nm, and a thickness of about 3-5 atomic layers.

2. Nano-particles according to claim 1, wherein the electrically conducting substance is selected from a group containing chemically pure metals, metals with additives, alloys and solid-state mixtures of metals, alloys of metals and semiconductors or dielectrics.

* * * * *